(12) United States Patent
Avkarogullari et al.

(10) Patent No.: US 8,576,247 B2
(45) Date of Patent: Nov. 5, 2013

(54) METHOD AND APPARATUS FOR ADJUSTING PIXEL VALUES

(75) Inventors: Gokhan Avkarogullari, San Jose, CA (US); William E. Bull, Campbell, CA (US); Szu-Wen Huang, Fremont, CA (US)

(73) Assignee: Apple Inc., Cupertino, CA (US)

(*) Notice: Subject to any disclaimer, the term of this patent is extended or adjusted under 35 U.S.C. 154(b) by 1010 days.

(21) Appl. No.: 11/971,054

(22) Filed: Jan. 8, 2008

(65) Prior Publication Data

US 2009/0033689 A1 Feb. 5, 2009

Related U.S. Application Data

(60) Provisional application No. 60/953,939, filed on Aug. 3, 2007.

(51) Int. Cl.
*G09G 5/00* (2006.01)
(52) U.S. Cl.
USPC ........... 345/606; 345/428; 345/581; 345/589; 345/608; 345/609; 345/610; 345/619; 382/260; 382/282; 382/283; 382/300
(58) Field of Classification Search
USPC ........................................................ 345/642
See application file for complete search history.

(56) References Cited

U.S. PATENT DOCUMENTS 6,068,597 A * 5/2000 Lin ............................... 600/443
6,873,341 B1 * 3/2005 Adams et al. ................. 345/629

OTHER PUBLICATIONS

"Mask—definition of mask by the Free Online Dictionary, Thesaurus and Encyclopedia" http://www.thefreedictionary.com/mask. (The American Heritage® Dictionary of the English Language, Fourth Edition copyright © 2000 by Houghton Mifflin Company. Updated in 2009. Published by Houghton Mifflin Company.) Accessed via the web, Mar. 20, 2012.*

* cited by examiner

*Primary Examiner* — Antonio A Caschera
(74) *Attorney, Agent, or Firm* — Wong, Cabello, Lutsch, Rutherford & Brucculeri LLP (57) ABSTRACT

The described embodiments comprise a system that adjusts pixel values to produce visual effects in a frame to be displayed. During operation, the system receives coordinates and pixel-adjustment values for one or more control points within the frame. Next, the system calculates pixel-adjustment values for pixels in the frame based on the coordinates and the pixel-adjustment values for the one or more control points. The system then applies the pixel-adjustment values to the pixels within the frame and displays the frame.

15 Claims, 13 Drawing Sheets

METHOD AND APPARATUS FOR ADJUSTING PIXEL VALUES

RELATED APPLICATION

This application hereby claims priority under 35 U.S.C. §119 to U.S. Provisional Patent Application No. 60/953,939 filed 3 Aug. 2007, entitled "Method and Apparatus for Adjusting Pixel Values," by inventors Gokhan Avkarogullari, William Bull, and Steven Huang.

BACKGROUND

1. Field of the Invention

The present invention relates to techniques for adjusting pixel values in an image to facilitate visual effects, such as transparency effects and fade-in/fade-out effects.

2. Related Art

Advances in semiconductor technology have led to increases in processing power which make it possible to render billions of pixels per second. As a result, visual effects in user interfaces, such as transparency effects and fade-in/fade-out effects, are becoming increasingly more common. These visual effects are typically created by adjusting pixel values within a frame. For example, if a transparency effect is desired, the alpha value (i.e., a transparency value) for each pixel is adjusted until the desired transparency level is achieved. Presently, such transparency effects are supported in hardware.

One hardware-supported technique for adjusting alpha values involves specifying an alpha value for the entire window or object. Pixel values are then adjusted based on the alpha value for the window. This technique is advantageous because the alpha value for all pixels in the window is set once for the entire window and does not need to be computed on a per-pixel basis. Unfortunately, only a limited range of visual effects can be achieved using this technique. For example, a time-varying transparency effect which moves from left to right across an image cannot be produced using this technique.

Another hardware-supported technique for adjusting alpha values involves specifying an alpha value for each pixel within a window. The benefit of this technique is that it is more flexible and can be used to produce a wider-range of visual effects than the above-described technique. Unfortunately, this technique is computationally expensive because a new alpha value must be calculated for each pixel for each frame. For example, consider a time-varying transparency effect which moves from the left edge of the frame to the right edge of the frame over a given time interval. The alpha value must be calculated for each column of pixels for each time interval. For example, at t=0, all alpha values are set to 1 (i.e., fully opaque). At t=1, the alpha values in column 1 are set to 0.95. At t=2, the alpha values in column 1 are set to 0.90 and the alpha values in column 2 is set to 0.95. At t=3, the alpha values in column 1 are set to 0.85, the alpha values in column 2 is set to 0.90, and the alpha values in column 3 are set to 0.95 (and so on).

Another problem with existing hardware techniques is that pixel operations require the in-memory pixel values to be modified. This operation can permanently change the pixel values for the frame which means that it is not possible to reverse the operation.

Hence, what is needed is a method and an apparatus for adjusting pixel values to produce visual effects in a frame to be displayed without the problems described above.

SUMMARY

Some embodiments of the present invention provide a system that adjusts pixel values to produce visual effects in a frame to be displayed. For example, the system can be used to create transparency effects, fade-in/fade-out effects, color adjustments, brightness adjustments, and gamma correction. These corrections can be made on-the-fly without modifying the pixel values stored in memory.

In some embodiments, the system receives coordinates and pixel-adjustment values for one or more control points within the frame. Next, the system calculates pixel-adjustment values for pixels in the frame based on the coordinates and the pixel-adjustment values for the one or more control points. The system then applies the pixel-adjustment values to the pixels within the frame and displays the frame.

In some embodiments, while calculating pixel-adjustment values for the frame, for each degree-of-freedom within the frame, the system interpolates pixel-adjustment values for the pixels between the one or more control points. For each pixel, the system applies a function to the interpolated pixel-adjustment values for each degree-of-freedom to generate a pixel-adjustment value for the pixel.

In some embodiments, while interpolating the pixel-adjustment values, the system uses one or more of: a linear interpolation technique; a polynomial interpolation technique; a spline interpolation technique; and other interpolation techniques now known or later developed.

In some embodiments, the function applied to the interpolated pixel-adjustment values comprises one or more of: addition; subtraction; multiplication; division; averaging; and other mathematical functions.

In some embodiments, while applying the pixel-adjustment values to the pixels within the frame, the system applies the pixel-adjustment values as a mask to the frame.

In some embodiments, if the mask is removed, the original pixel values for the frame are restored.

In some embodiments, a control point comprises: a location of the control point within the frame; and magnitudes of one or more pixel-adjustment values for the control point.

In some embodiments, a pixel value comprises one or more of: an alpha value for an associated pixel; a luminance value for the associated pixel; chrominance values for the associated pixel; gamma-correction values for the associated pixel; and other pixel values for the associated pixel.

In some embodiments, the control points are associated with one or more window objects.

In some embodiments, prior to receiving one or more control points, the system defines control points within the frame.

Some embodiments provide a display mechanism which comprises a receiver circuit, a pixel-adjustment-calculation circuit, and a pixel-adjustment circuit. The receiver circuit is configured to: receive a frame to be displayed from a memory and to receive coordinates and pixel-adjustment values for one or more control points within the frame. Next, the pixel-adjustment-calculation circuit is configured to calculate pixel-adjustment values for pixels in the frame based on the coordinates and the pixel-adjustment values for the one or more control points. Finally, the pixel-adjustment circuit is configured to apply the pixel-adjustment values to the pixels within the frame.

In some embodiments, the display unit further comprises an output driver circuit configured to drive a display with the pixel values for the frame.

In some embodiments, the display unit further comprises a register set which is configured to store one or more of: locations of control points within the frame; magnitudes of one or more pixel-adjustment values; pointers to the frame in the memory; the dimensions of the frame; and a color format for the frame.

In some embodiments, the display unit is a component within a computer system. In one embodiment, the computer system is a portable computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1A:
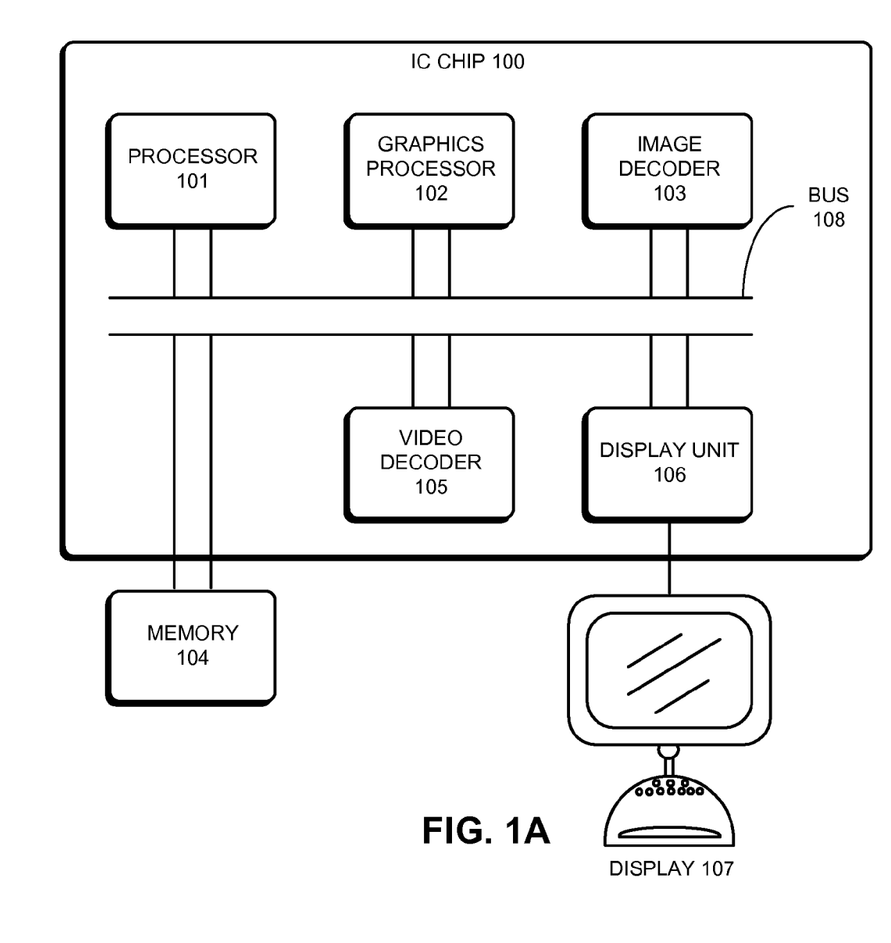
FIG. 1A presents a block diagram of a system for adjusting pixel values within a frame to be displayed in accordance with an embodiment of the present invention.

FIG. 1A presents a block diagram of a system for adjusting pixel values in a frame to be displayed in accordance with an embodiment of the present invention. The system includes, but is not limited to, processor 101, graphics processor 102, image decoder 103, video decoder 105, display unit 106, memory 104, and display 107. In some embodiments, these components can be coupled to each other through bus 108. In some embodiments, bus 108 can include one or more of: point-to-point buses, shared buses, and any bus now known or later developed.

In some embodiments, integrated circuit (IC) chip 100 includes one or more of: processor 101, graphics processor 102, image decoder 103, video decoder 105, and display unit 106.

Processor 101 can generally include any type of processor, including, but not limited to, a microprocessor, a mainframe computer, a digital signal processor, a personal organizer, a device controller and a computational engine within an appliance.

Graphics processor 102 can include a dedicated processor which performs graphics operations on pixels. For example, graphics processor 102 can include, but is not limited to, a graphics processing unit (GPU). In one embodiment, graphics processor 102 performs graphics operations on a video signal. The video signal can generally include any signal to be displayed on display 107. For example, the video signal can include a movie, a digital photograph, or graphical user interface (GUI) objects. Memory 104 can include any type of memory, including but not limited to, dynamic random access memory (DRAM), static random access memory (SRAM), flash memory, read only memory (ROM), and any other type of memory now known or later developed.

In some embodiments, image decoder 103 decodes image data to produce pixel values for a frame to be displayed. For example, image decoder 103 can decode a JPEG image. In some embodiments, video decoder 105 decodes video data to produce pixel values for a frame to be displayed. For example, video decoder 105 can decode an MPEG movie.

Display 107 can include any device which can display the user interface for the system, including, but not limited to: a cathode ray tube (CRT) display, a liquid crystal display (LCD), a television display, a plasma display, a projector, and any display now known or later developed.

Note that the system illustrated in FIG. 1A can include other components that are not shown. For example, the system can also include, but is not limited to, a network interface, I/O ports, and a storage device. The network interface can include any type of interface that provides connectivity between a computer system and a network, including, but not limited to: a wireless network interface, an Ethernet interface, and a phone network interface. The I/O ports can include one or more I/O ports, wherein each port can include, but is not limited to, a serial port, a parallel port, a PS/2 port, a Universal Serial Bus (USB) port, a video graphics array (VGA) port, a Digital Visual Interface (DVI) port, a mini-DVI port, a High-Definition Multimedia Interface (HDMI), a DisplayPort port, an Ethernet port, a modem port, or any other I/O port now known or later developed. The storage device can include any type of non-volatile storage device that can be coupled to a computer system. This includes, but is not limited to, magnetic, optical, and magneto-optical storage devices, as well as storage devices based on flash memory and/or battery-backed up memory.

In some embodiments, IC chip 100 is part of a computer system which can include, but is not limited to IC chip 100, memory 104, display 107, and a storage device.

Figure 1B:
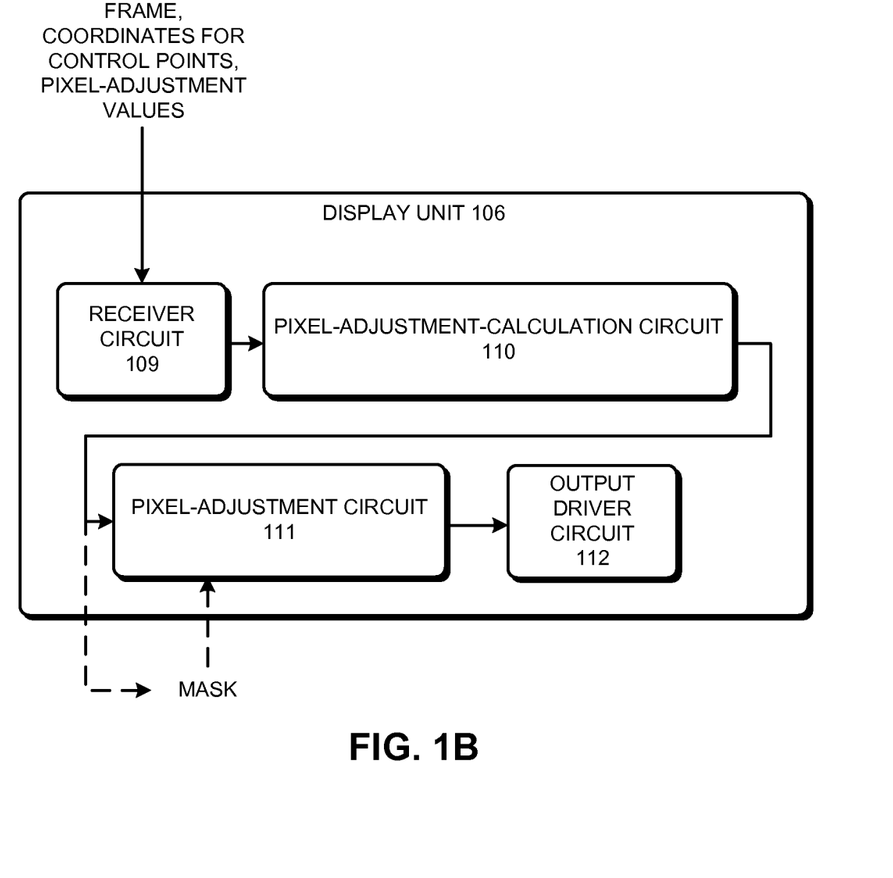
FIG. 1B presents a block diagram of the components within a display unit in accordance with an embodiment of the present invention.

FIG. 1B presents a block diagram of the components within display unit 106 in accordance with an embodiment of the present invention. Display unit 106 can include, but is not limited to, receiver circuit 109, pixel-adjustment-calculation circuit 110, pixel-adjustment circuit 111, and output driver circuit 112. Receiver circuit 109 is configured to receive a frame to be displayed from memory and to receive coordinates and pixel-adjustment values for one or more control points within the frame. Pixel-adjustment-calculation circuit 110 is configured to calculate pixel-adjustment values for pixels in the frame based on the coordinates and the pixel-adjustment values for the one or more control points. Pixel-adjustment circuit 111 is configured to apply the pixel-adjustment values to the pixels within the frame. In some embodiments, the pixel-adjustment values are used to create a mask, which is then applied to the frame to produce the desired visual effect. Output driver circuit 112 is configured to drive a display with the pixel values for the frame.

In some embodiments, display unit 106 includes a set of registers (not shown). In some embodiments, the set of registers is configured to store one or more of: locations of control points within the frame; magnitudes of one or more pixel-adjustment values; pointers to the frame in the memory; the dimensions of the frame (or a subset of the frame); and a color format for the frame (or the subset of the frame).

In some embodiments, one or more of the components illustrated in FIG. 1B can be located on a separate module. Furthermore, the separate module can be located on or off of IC chip 100.

In some embodiments, the components are located on a portable computer system such as a mobile phone, a personal digital assistant (PDA), or a laptop computer.

Adjusting Pixel Values

Figure 2A:
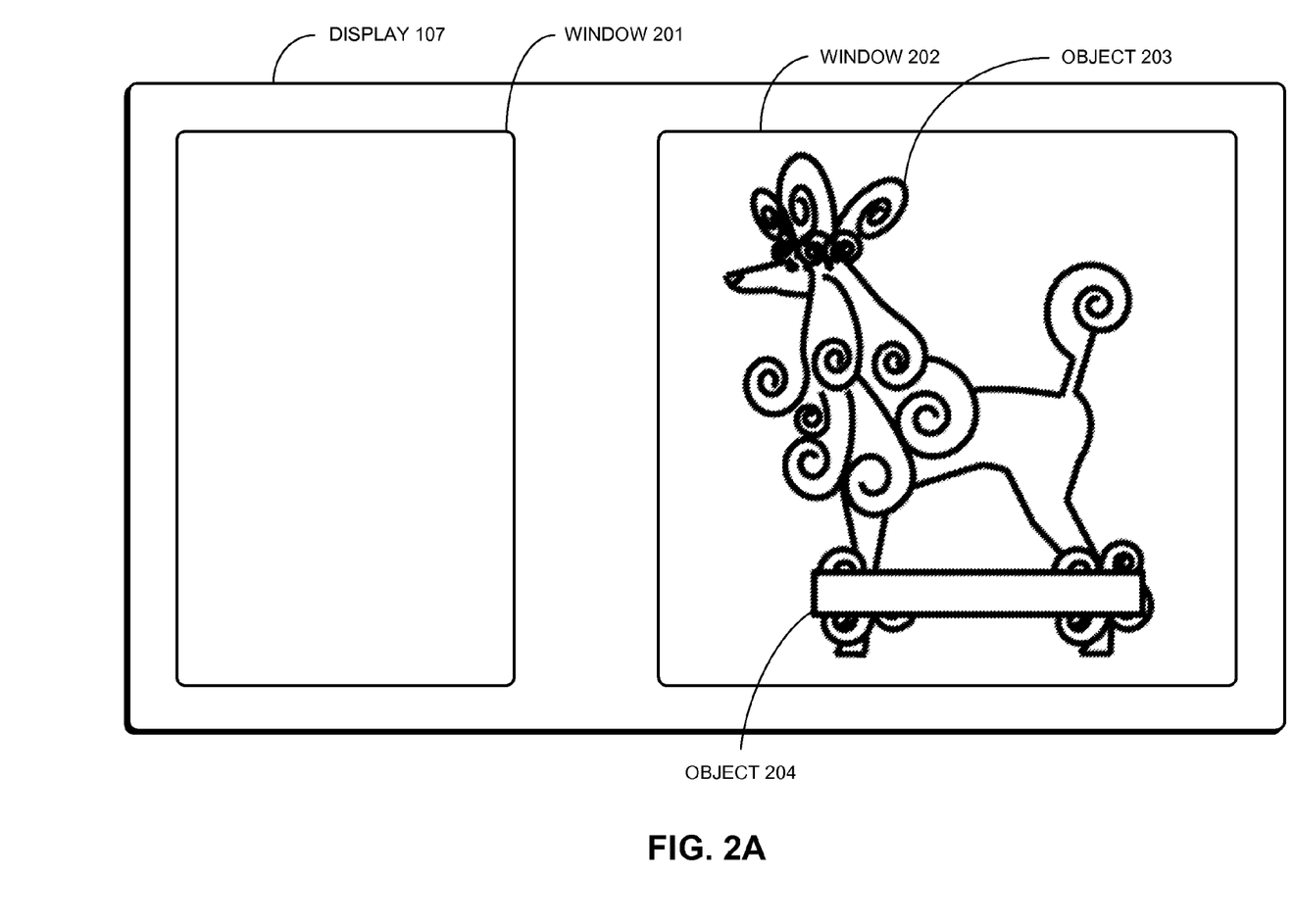
FIG. 2A illustrates a transparency effect applied to objects in accordance with an embodiment of the present invention.
Figure 2B:
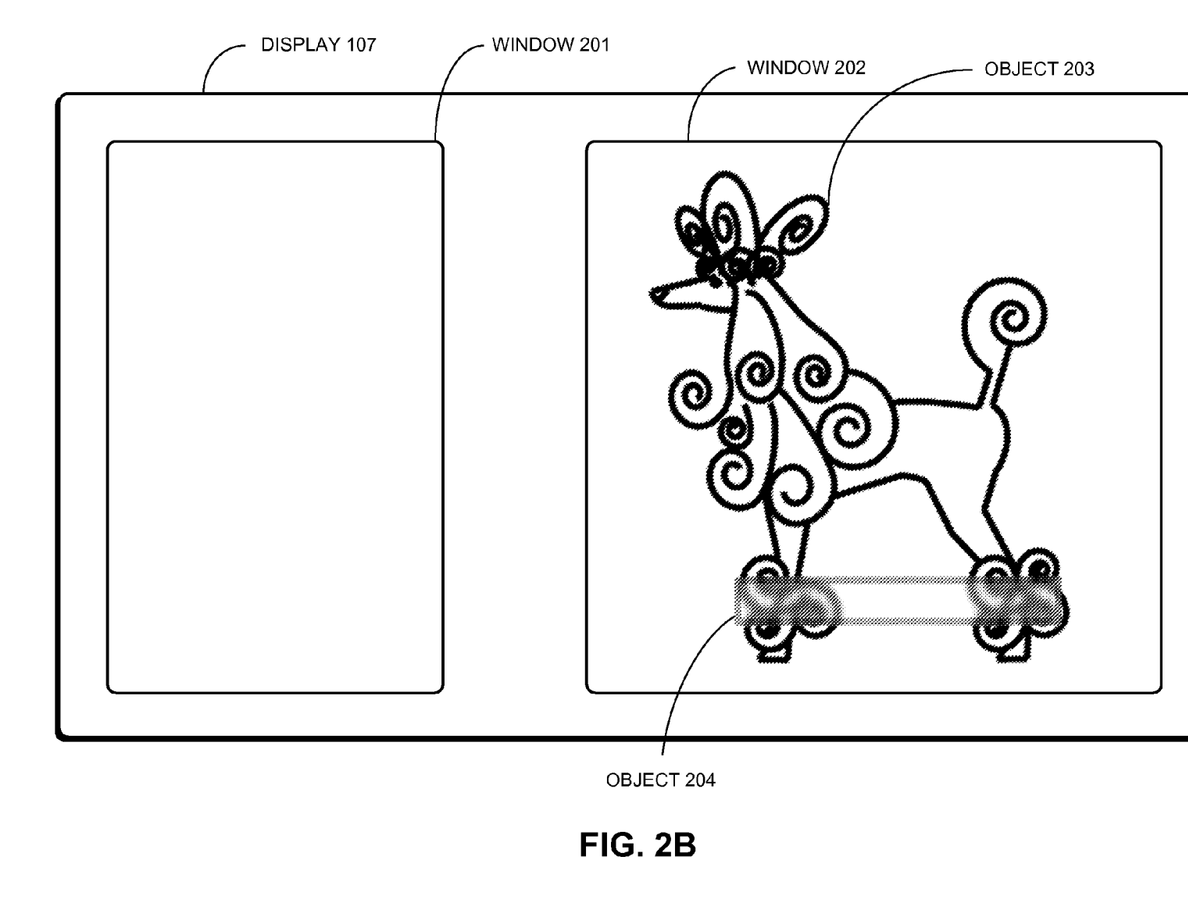
FIG. 2B illustrates another transparency effect applied to objects in accordance with an embodiment of the present invention.
Figure 2C:
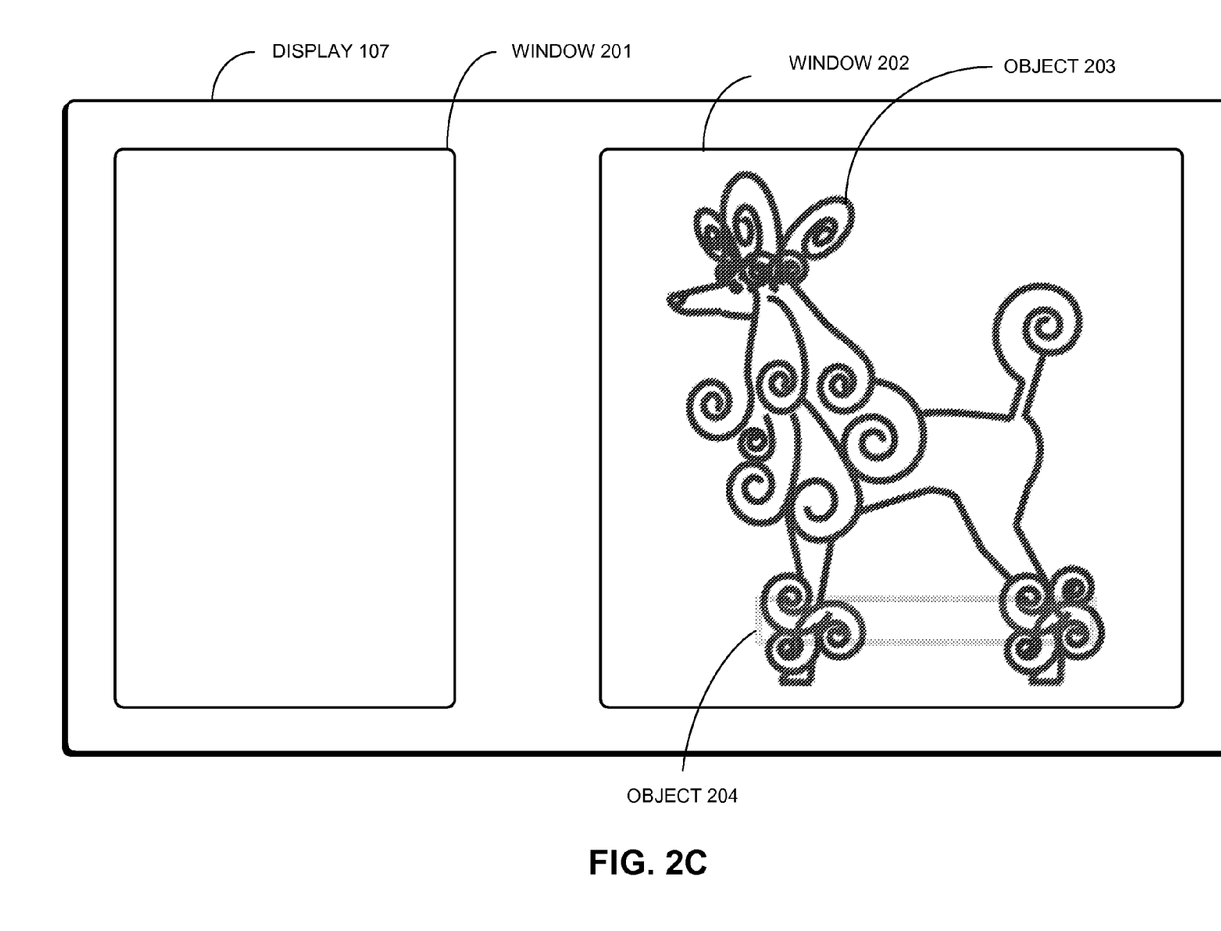
FIG. 2C illustrates another transparency effect applied to objects in accordance with an embodiment of the present invention.

FIGS. 2A-2C illustrate windows 201 and 202 which are being displayed within display 107 in accordance with an embodiment of the present invention. As illustrated, window 202 includes object 203. Object 204 is overlaid on top of window 202. Note that in general, any number of windows or objects can be displayed within display 107. Furthermore, the windows and/or objects can overlap with each other in any order. For example, a portion of (or all of) window 201 can overlap window 202 so that window 201 obscures the overlapped portion of window 202.

In some embodiments, the pixel values for the windows and window objects can be adjusted to produce visual effects. For example, a transparency effect can be applied to object 203 (within window 202) and object 204 (which overlaps and obscures a portion of window 202) so that object 203 can be seen through a semi-transparent object 204. This transparency effect is illustrated in FIG. 2B. In FIG. 2C, the transparency of object 204 is increased so that more of object 203 can be seen through object 204. Note that other pixel values can be adjusted. In some embodiments, these other pixel values can include, but are not limited to, a luminance value, chrominance values, gamma-correction values, and any other pixel values.

Figure 3A:
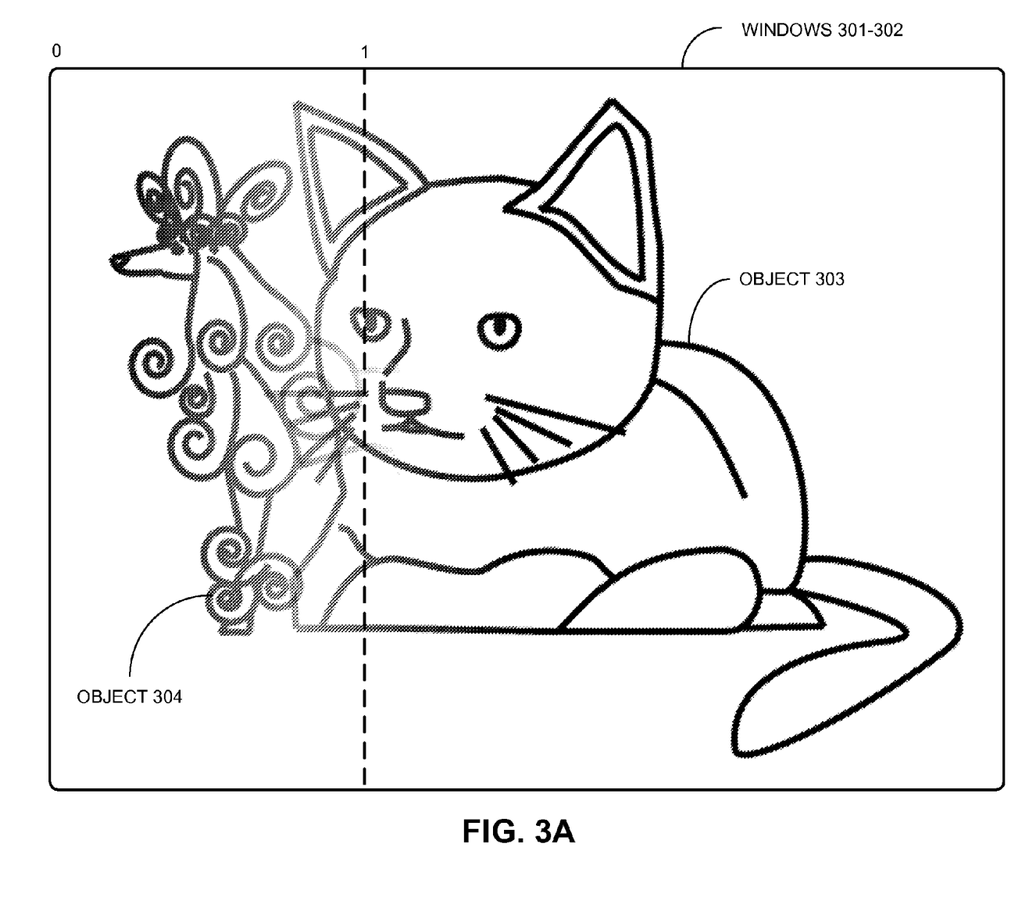
FIG. 3A illustrates a control point within a window in accordance with an embodiment of the present invention.
Figure 3B:
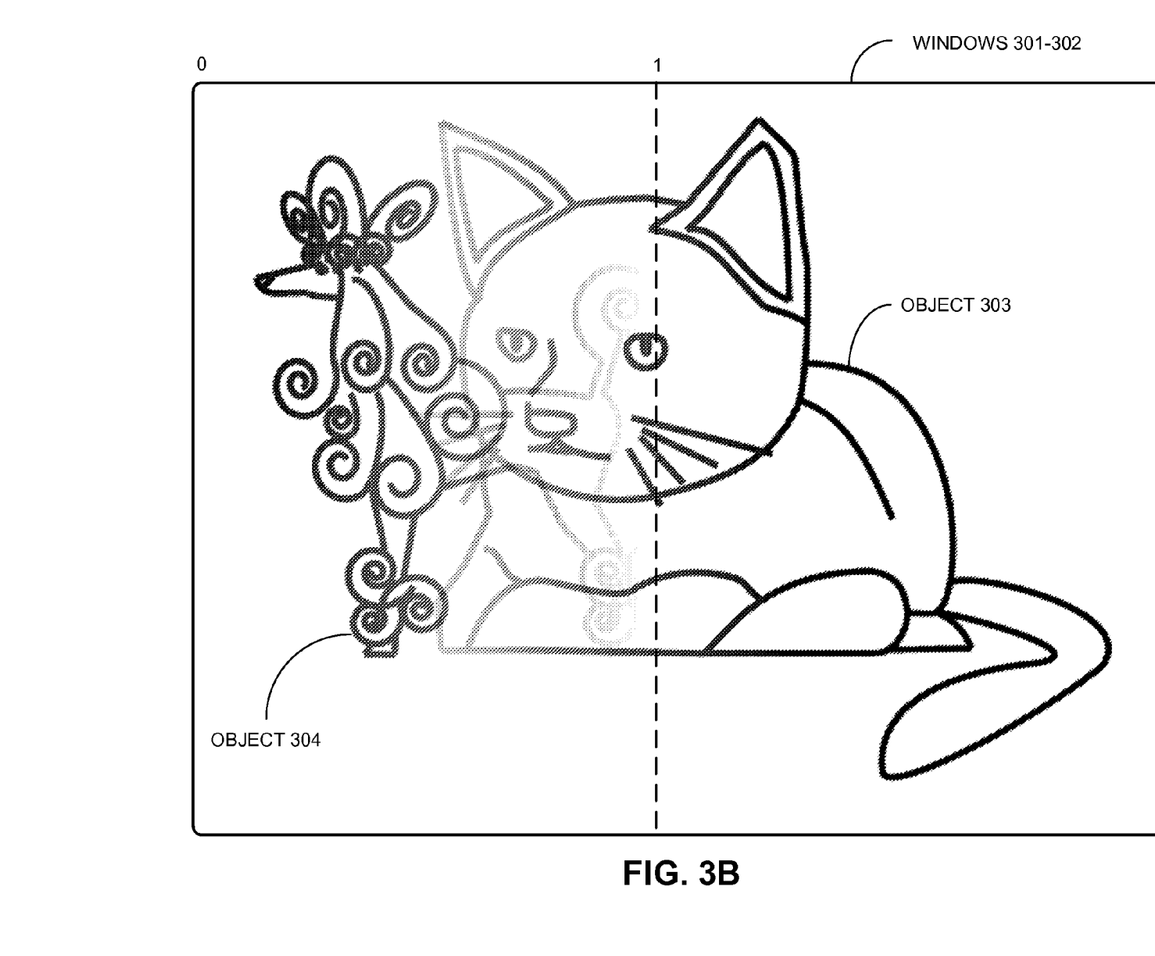
FIG. 3B illustrates another control point within a window in accordance with an embodiment of the present invention.
Figure 3C:
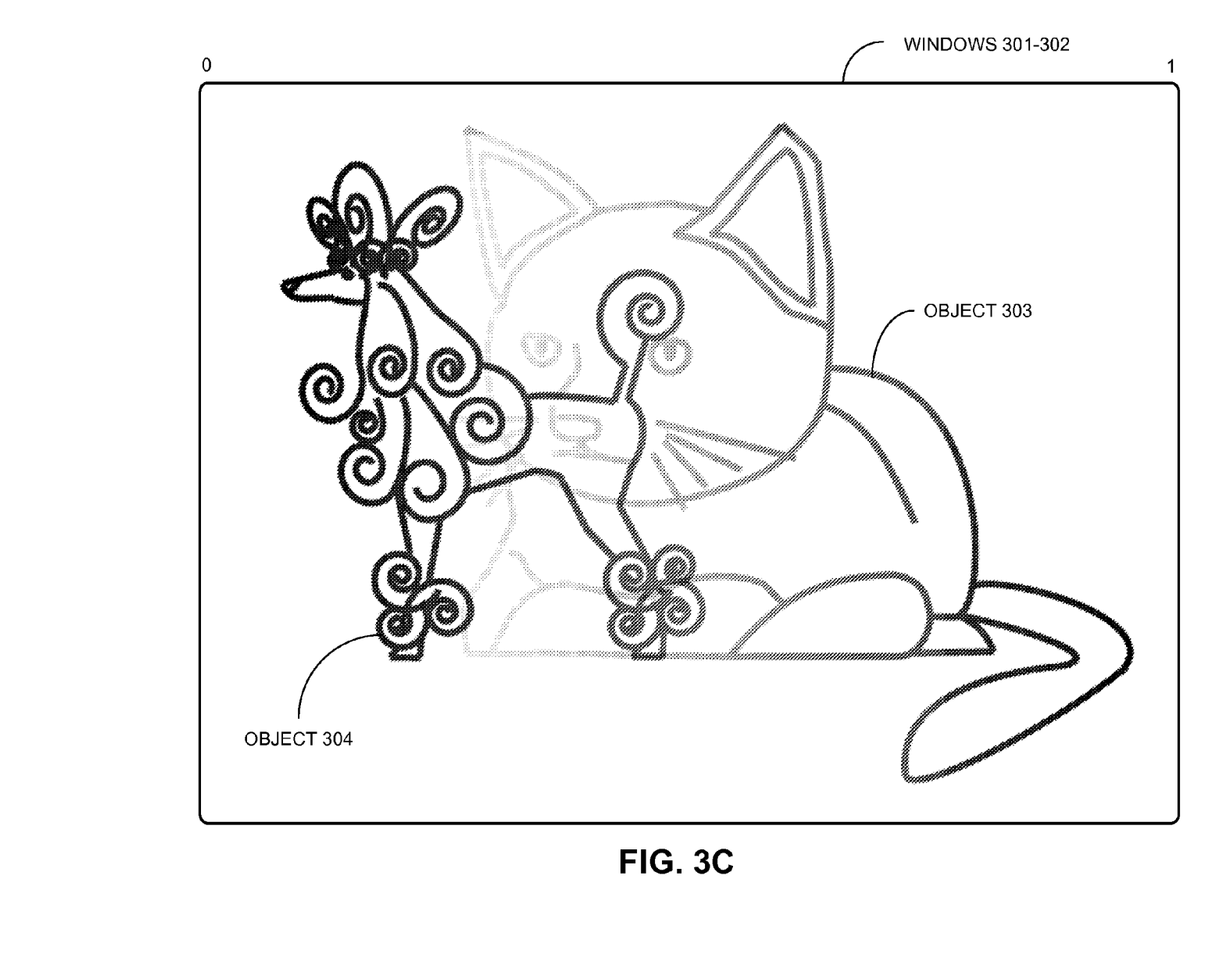
FIG. 3C illustrates another control point within a window in accordance with an embodiment of the present invention.

In some embodiments, complex visual effects can be achieved by using control points within a window or window object to define how pixel values are to be adjusted. FIGS. 3A-3F illustrate windows 301 and 302, which include objects 303 and 304, respectively. As illustrated in FIGS. 3A-3F, window 301 overlaps and obscures window 302. In FIGS. 3A-3C, window 301 is associated with a single control point which is used to adjust the alpha value (i.e., transparency value) for pixels within window 301 from a value of 0 (i.e., full transparency) to a value of 1 (i.e., full opacity). Although this example illustrates an alpha value of zero at the left edge of window 301 and an alpha value of one at the control point, the alpha values at the left edge and at the control point can be any value between full opacity to full transparency.

Note that window 302 can also have its own control point for adjusting alpha values for pixels within window 302. Also note that the endpoints of the values can be values other than full transparency and full opacity. Furthermore, note that the discussion below is not limited to alpha values, but can equally apply to any pixel value (e.g., luminance, chrominance, etc.).

In some embodiments, the alpha values to the right of the control point illustrated in FIGS. 3A-3C are set to the same value as the control point (i.e., a value of 1 in these examples). In some other embodiments, the alpha values to the right of the control point are set to a specified alpha value. In some embodiments, a function defines the alpha values to the right of the control value. In the discussion below, the alpha value is set so that it is 1 for all pixels to the right of the control point.

In some embodiments, alpha values between the left edge and the control point are interpolated based on the alpha value on the left edge and the control point. For example, linear interpolation can be used to generate the alpha values between the left edge and the control point. In FIGS. 3A-3C, window 301 is fully transparent on the left edge and the opacity of window 301 increases linearly until it is fully opaque at the control point. Thus, object 304 within window 302 is obscured more and more by object 303 within window 301 until object 304 cannot be seen anymore at the control point.

In some embodiments, the control point can be moved in subsequent frames to produce a desired visual effect. For example, to gradually make object 304 within window 302 visible through window 301 (and object 303), the control point can be moved to the right in subsequent frames (e.g., see FIGS. 3A-3C).

In some embodiments, the pixel-adjustment value at the control point can be changed to produce a desired effect. For example, the alpha value for the control point can be changed so that object 303 within window 301 oscillates from being more opaque to more transparent.

Note that as window 301 (and object 303) becomes more transparent, more of the background color can be seen through window 301 (e.g., the colors in window 302 are blended with the colors for window 301).

Note that the control points can be located anywhere within window 301. For example, the control point can be located on the left edge of window 301. Also note that the line formed by the control point can be in any orientation. For example, the line can be horizontal, vertical, or in an orientation defined by a function.

In some embodiments, multiple control points can be used to adjust pixel values in a window. For example, three control points can be used in window 301: a 0 control point at the left edge of window 301, a 0 control point at the right edge of window 301, and a 1 control point in between the two zero control points. As before, the alpha values between the control points can be determined by a mathematical function, or specified explicitly.

In some embodiments, each control point is associated with a color value. In these embodiments, a specified function is used to determine the color values between the control points. For example, a linear function can be used. Hence, a gradient effect can be produced between each pair of control points (e.g., a gradient from grey to black, etc.). Note that multiple visual effects can be applied at the same time. For example, a transparency effect and a gradient effect can both be applied to window objects at the same time.

Figure 3D:
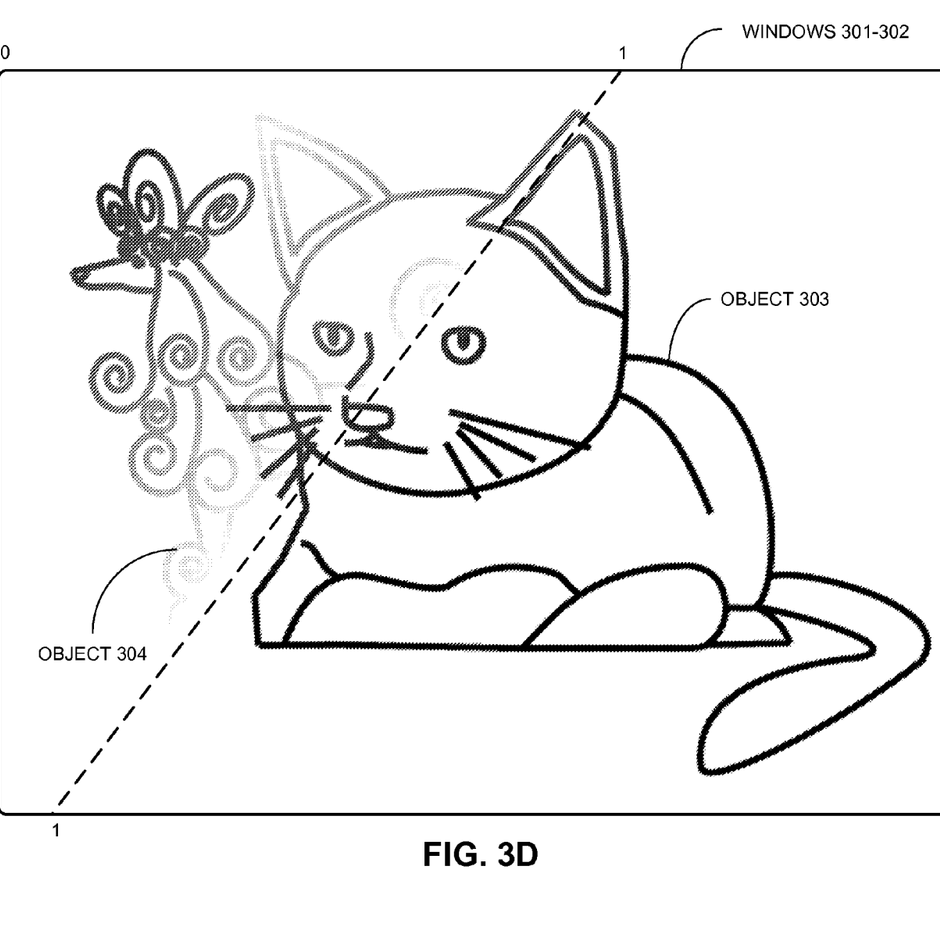
FIG. 3D illustrates two control points within a window in accordance with an embodiment of the present invention.
Figure 3E:
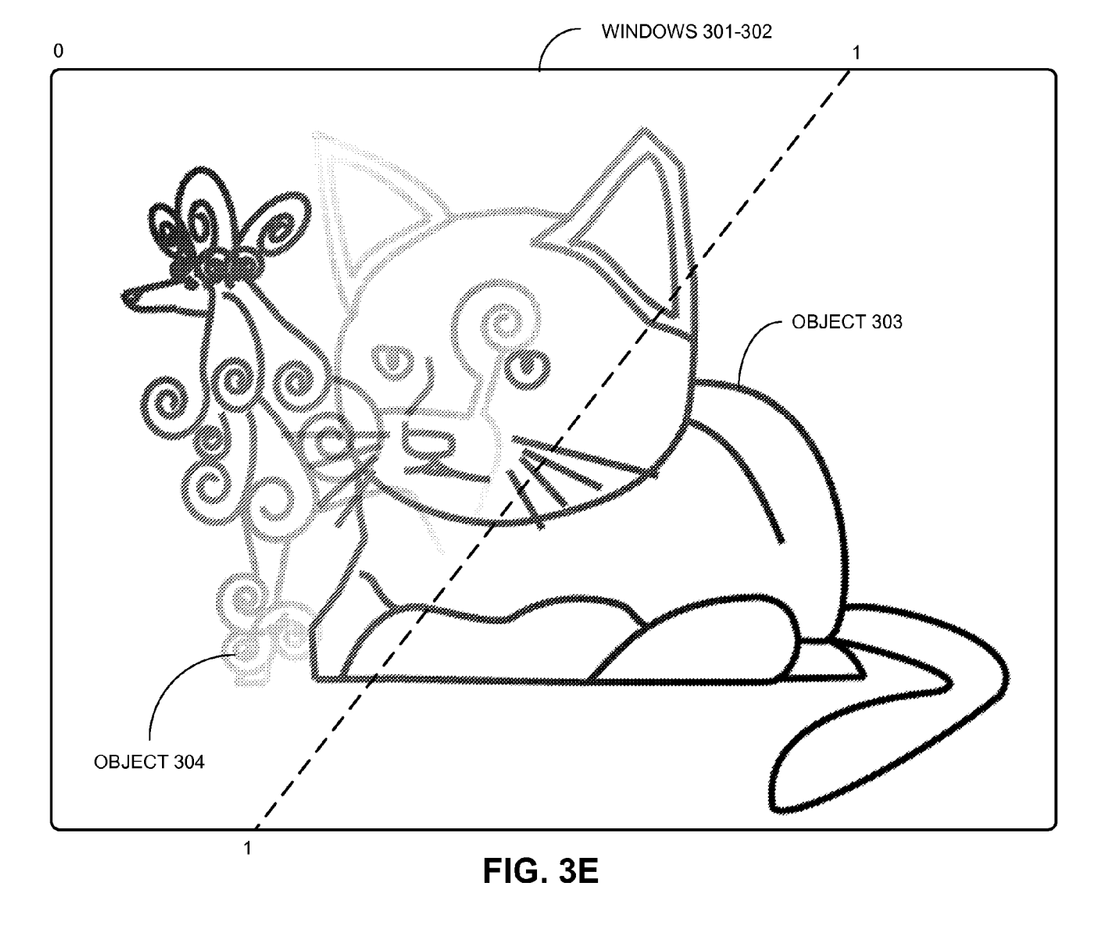
FIG. 3E illustrates two other control points within a window in accordance with an embodiment of the present invention.
Figure 3F:
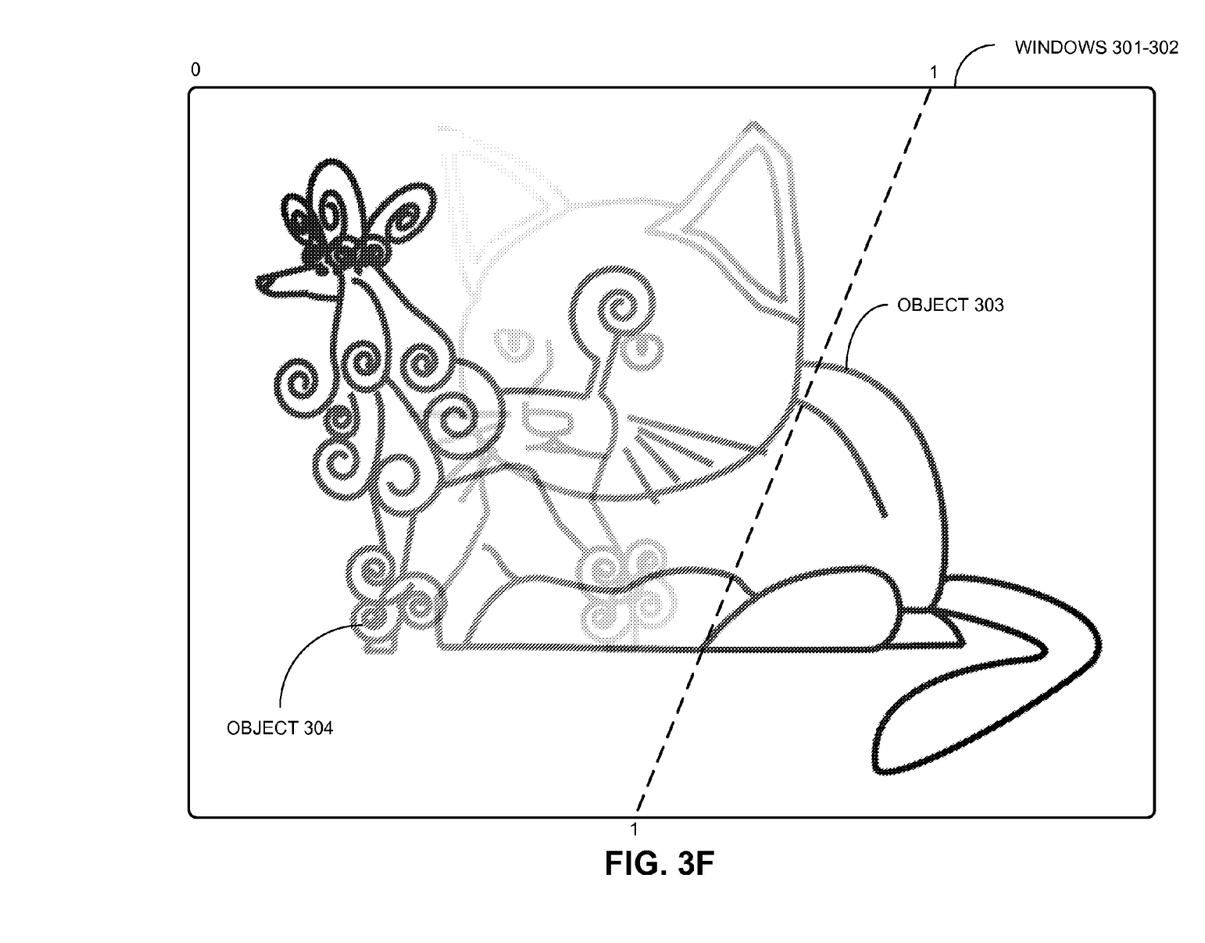
FIG. 3F illustrates two other control points within a window in accordance with an embodiment of the present invention.

FIGS. 3D-3F illustrate another technique for using multiple control points to adjust pixel values in a window. Although FIGS. 3D-3F illustrate a straight line between the two control points, any function which defines a line that passes through the two control points can be used. Also note that the control points can be located anywhere within a window.

In some embodiments, the control points can be moved in subsequent frames to produce a desired visual effect. For example, to gradually make object 304 within window 302 visible through window 301 (and object 303), the control point can be moved to the right in subsequent frames (e.g., see FIGS. 3D-3F).

Figure 4:
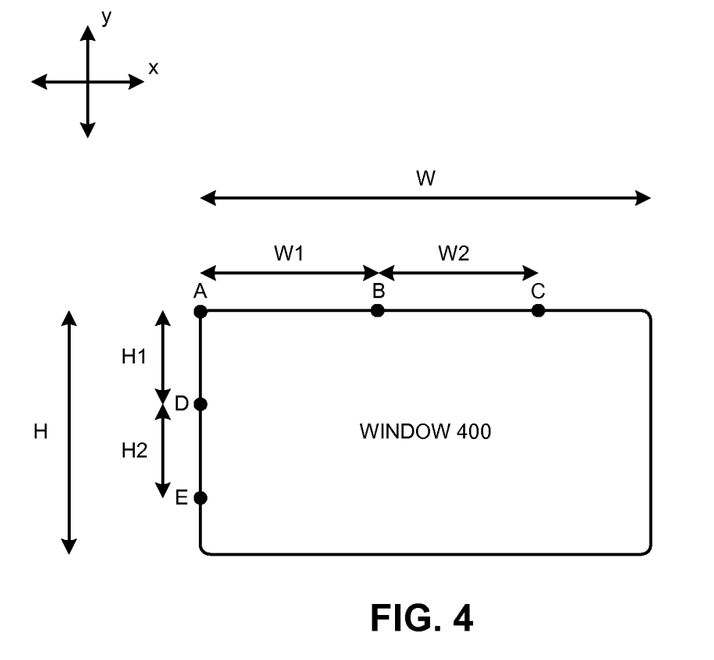
FIG. 4 illustrates a number of control points at specified points within a window in accordance with an embodiment of the present invention.

FIG. 4 illustrates a number of control points at specified locations within window 400 of width W and height H in accordance with an embodiment of the present invention. Note that although FIG. 4 illustrates control points on the edges of window 400, the control points can be located anywhere within window 400. Window 400 includes five control points A, B, C, D, and E. Each control point includes a coordinate within window 400 and a pixel-adjustment value. In some embodiments, one or more of the coordinate and the pixel-adjustment value for the control point can be changed. Control points A and B are separated by a distance of $W_1$. Control points B and C are separated by a distance of $W_2$. Control points A and D are separated by a distance of $H_1$. Control points D and E are separated by a distance of $H_2$.

In some embodiments, pixel-adjustment values for the pixels between the control points are interpolated. In some embodiments, the interpolation technique can include one or more of: a linear interpolation technique; a polynomial interpolation technique, and other interpolation techniques now known or later developed. For the sake of clarity, a linear interpolation technique is described below. However, any other interpolation technique can be used.

In some embodiments, if there is more than one degree-of-freedom, pixel-adjustment values are calculated for each degree of freedom. In FIG. 4, there are two degrees-of-freedom (rows and columns), and thus, pixel-adjustment values are calculated for the rows and columns. For a linear interpolation technique, a piecewise-linear point-slope function can be used to interpolate the pixel-adjustment values for a given pixel within the frame. The slope can be determined from pixel-adjustment values and the coordinates of the pixel-adjustment values for the corresponding control point pairs (e.g., A-B, B-C, A-D and D-E).

The following is an exemplary implementation for the example illustrated in FIG. 4. For each row, the alpha value for a given row ($\alpha_{row}$) can be calculated as follows:

$$\alpha_{row} = \alpha_A + S_3 \cdot y, \text{ if } A_y < y < D_y \quad (1)$$

$$\alpha_{row} = \alpha_D + S_4 \cdot (y - D_y), \text{ if } D_y < y < E_y \quad (2)$$

$$\alpha_{row} = \alpha_E, \text{ if } E_y < y \quad (3)$$

where a given control point Q includes a coordinate ($Q_x$, $Q_y$) and an alpha value $\alpha_Q$.

Note that in equations (1)-(2), if the previous $\alpha_{row}$ values ($\alpha_{prevr}$) are maintained when calculating the next $\alpha_{row}$ value, the equations (1) and (2) simply become:

$$\alpha_{row} = \alpha_{prevr} + S_3, \text{ if } A_y < y < D_y \quad (4)$$

$$\alpha_{row} = \alpha_{prevr} + S_4, \text{ if } D_y < y < E_y \quad (5)$$

Hence, the calculation of $\alpha_{row}$ only involves addition operations (i.e., no multiplication operations).

$S_1$, $S_2$, $S_3$, and $S_4$ are defined as follows:

$$S_1 = \frac{\alpha_B - \alpha_A}{w_1} \quad (6)$$

$$S_2 = \frac{\alpha_C - \alpha_B}{w_2} \quad (7)$$

$$S_3 = \frac{\alpha_A - \alpha_D}{h_1} \quad (8)$$

$$S_4 = \frac{\alpha_D - \alpha_E}{h_2} \quad (9)$$

In some embodiments, $S_1$, $S_2$, $S_3$, and $S_4$ are calculated once for each window and stored for use in subsequent calculations.

For each column, the alpha value for a given column ($\alpha_{pixel}$) is calculated as follows:

$$\alpha_{col} = \alpha_A + S_1 \cdot x, \text{ if } A_x < x < B_x \quad (10)$$

$$\alpha_{col} = \alpha_D + S_2 \cdot (x - B_x), \text{ if } B_x < x < C_x \quad (11)$$

$$\alpha_{col} = \alpha_E, \text{ if } C_x < x \quad (12)$$

Note that in equations (10)-(11), if the previous $\alpha_{col}$ values ($\alpha_{prevc}$) are maintained when calculating the next $\alpha_{col}$ value, the equations (10) and (11) simply become:

$$\alpha_{col} = \alpha_{prevc} + S_1, \text{ if } A_x < x < B_x \quad (13)$$

$$\alpha_{col} = \alpha_{prevc} + S_2, \text{ if } B_x < x < C_x \quad (14)$$

Hence, the calculation of $\alpha_{col}$ only involves addition operations (i.e., no multiplication operations).

For each pixel, the alpha value for a given pixel ($\alpha_{pixel}$) can be calculated as follows:

$$\alpha_{pixel} = \frac{\alpha_{col} + \alpha_{row}}{2} \quad (15)$$

Note that any other combination of $\alpha_{col}$ and $\alpha_{row}$ can be used. In some embodiments, for each pixel, a function is applied to the interpolated pixel-adjustment values for each degree-of-freedom to generate a pixel-adjustment value for the pixel. For the example illustrated in FIG. 4, there are two degrees-of-freedom (rows and columns); thus, a function is applied to the row pixel-adjustment value and the column pixel-adjustment value for each pixel. In some embodiments, the function can include, but is not limited to, addition, subtraction, multiplication, division, averaging, and any other mathematical functions.

In some embodiments, the pixel-adjustment values are applied to the pixels in the window as a mask. Hence, the original pixel values for the frame are not modified. Thus, if the mask is removed, the original pixel values for the frame are restored.

Figure 5:
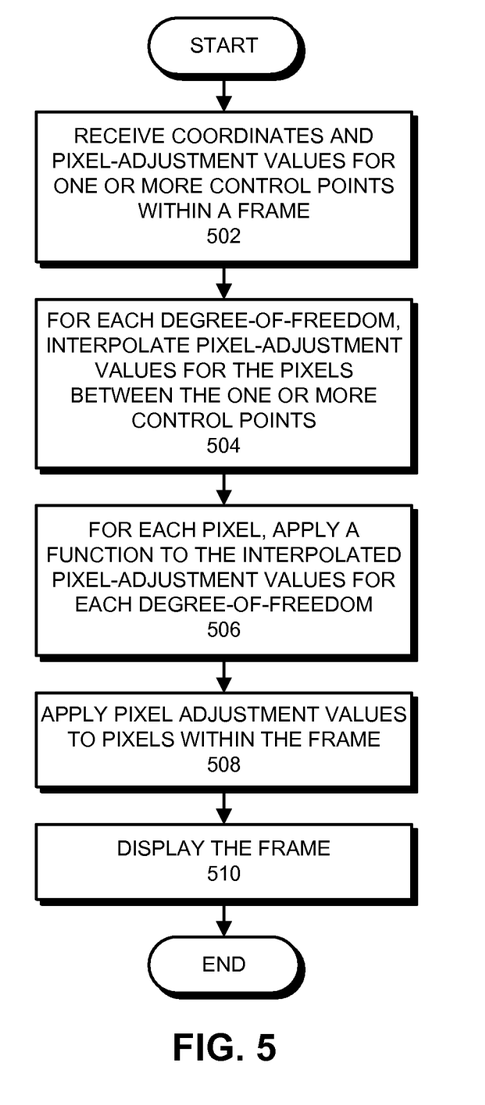
FIG. 5 presents a flow chart illustrating the process of adjusting pixel values within a frame to be displayed in accordance with an embodiment of the present invention.

FIG. 5 presents a flow chart illustrating the process of adjusting pixel values within a frame to be displayed in accordance with an embodiment of the present invention. The process begins when the system receives coordinates and pixel-adjustment values for one or more control points within the frame (step 502). For each degree-of-freedom within the frame, the system interpolates pixel-adjustment values for the pixels between the one or more control points (step 504). For each pixel, the system applies a function to the interpolated pixel-adjustment values for each degree-of-freedom to generate a pixel-adjustment value for the pixel (step 506). The system applies the pixel-adjustment values to the pixels within the frame (step 508) and displays the frame (step 510).

In some embodiments, the system can be implemented in hardware. For example, the system can be incorporated into display unit 106. In other embodiments, the system can be implemented in software.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for adjusting pixel values within a frame to be displayed, comprising:
   receiving, with one or more processors, first pixel values for a first set of pixels corresponding to a first window and second pixel values for a second set of pixels corresponding to a second window, wherein the first window and the second window are to be displayed within a frame;
   receiving, with the one or more processors, coordinates and pixel adjustment values for one or more control points within the first window, wherein the coordinates comprise a location within the first window of the control point, and wherein the pixel adjustment value for the control point comprises a magnitude value;
   calculating, with the one or more processors, pixel adjustment values for a plurality of pixels in the first set of pixels based, at least in part, on the coordinates and the pixel adjustment values for the one or more control points;
   determining, with the one or more processors, adjusted first pixel values for the plurality of pixels by applying the calculated pixel adjustment values to the plurality of pixels; and
   displaying, with the one or more processors, the first window and the second window within the frame based, at least in part, on the adjusted first pixel values,
   wherein the first window and the second window are at least partially overlapping within the frame.

2. The method of claim 1, wherein the act of calculating pixel adjustment values comprises:
   interpolating, for each degree-of-freedom within the first window, pixel adjustment values for the pixels between the one or more control points; and
   applying, for each pixel of the plurality of pixels, a function to the interpolated pixel adjustment values for each degree-of-freedom.

3. The method of claim 2, wherein the act of interpolating pixel adjustment values involves using one or more of:
   a linear interpolation technique;
   a polynomial interpolation technique; and
   a spline interpolation technique.

4. The method of claim 2, wherein the act of applying a function to the interpolated pixel adjustment value comprises one or more of:
   addition;
   subtraction;
   multiplication;
   division;
   averaging; and
   other mathematical functions.

5. The method of claim 1, wherein the act of determining adjusted first pixel values for the plurality of pixels comprises applying the calculated pixel adjustment values as a mask so that the first pixel values for the plurality of pixels are retained.

6. The method of claim 1, wherein the calculated pixel adjustment values comprise one or more of:
   an alpha value;
   a luminance value;
   chrominance values; and
   gamma-correction values.

7. A display system, comprising:
   a receiver circuit configured to:
      receive first pixel values for a first set of pixels corresponding to a first window and second pixel values for a second set of pixels corresponding to a second window, wherein the first window and the second window are to be displayed within a frame; and
      receive coordinates and pixel adjustment values for one or more control points within the first window, wherein the coordinates comprise a location within the first window of the control point, and wherein the pixel adjustment value for the control point comprises a magnitude value;
   a pixel-adjustment-calculation circuit configured to calculate pixel adjustment values for a plurality of pixels in the first set of pixels based, at least in part, on the coordinates and the pixel adjustment values for the one or more control points;
   a pixel-adjustment circuit configured to determine adjusted first pixel values for the plurality of pixels by applying the calculated pixel adjustment values to the plurality of pixels; and
   an output driver circuit configured to drive a display unit to display the first window and the second window within the frame based, at least in part, on the adjusted first pixel values,
   wherein the first window and the second window are at least partially overlapping within the frame.

8. The display system of claim 7, further comprising a register set, wherein the register set is configured to store one or more of:
   locations of control points within the first window;
   magnitudes of one or more pixel adjustment values;
   pointers to the frame in a memory;
   dimensions of the frame;
   dimensions for a subset of the frame;
   a color format for the frame; and
   a color format for a subset of the frame.

9. A system, comprising:
   a memory; and
   a display system, comprising:
      a receiver circuit configured to:
         receive first pixel values for a first set of pixels corresponding to a first window and second pixel values for a second set of pixels corresponding to a second window, wherein the first window and the second window are to be displayed within a frame; and
         receive coordinates and pixel adjustment values for one or more control points within the first window, wherein the coordinates comprise a location within the first window of the control point, and wherein the pixel adjustment value for the control point comprises a magnitude value;
      a pixel-adjustment-calculation circuit configured to calculate pixel adjustment values for a plurality of pixels in the first set of pixels based, at least in part, on the coordinates and the pixel adjustment values for the one or more control points;

a pixel-adjustment circuit configured to determine adjusted first pixel values for the plurality of pixels by applying the calculated pixel adjustment values to the plurality of pixels; and an output driver circuit configured to generate a display of the first window and the second window within the frame based, at least in part, on the adjusted first pixel values, wherein the first window and the second window are at least partially overlapping within the frame.

10. The system of claim 9, wherein the system is a portable device.

11. The system of claim 9, further comprising one or more of:

a central-processing unit coupled to the memory and the display unit via a bus;

a graphics-processing unit coupled to the memory and the display unit via the bus;

a video decoder coupled to the memory and the display unit via the bus; and an image decoder coupled to the memory and the display unit via the bus.

12. The system of claim 9, further comprising a display device coupled to the display unit, wherein the display device is configured to display the frame.

13. A non-transitory computer-readable storage medium storing instructions that when executed by a computer cause the computer to perform a method for adjusting pixel values within a frame to be displayed, wherein the method comprises:

receiving first pixel values for a first set of pixels corresponding to a first window and second pixel values for a second set of pixels corresponding to a second window, wherein the first window and the second window are to be displayed within a frame;

receiving coordinates and pixel adjustment values for one or more control points within the first window, wherein the coordinates comprise a location within the first window of the control point, and wherein the pixel adjustment value for the control point comprises a magnitude value;

calculating, with the one or more processors, pixel adjustment values for a plurality of pixels in the first set of pixels based, at least in part, on the coordinates and the pixel adjustment values for the one or more control points;

determining, with the one or more processors, adjusted first pixel values for the plurality of pixels by applying the calculated pixel adjustment values to the plurality of pixels; and displaying the first window and the second window within the frame based, at least in part, on the adjusted first pixel values, wherein the first window and the second window are at least partially overlapping within the frame.

14. The computer-readable storage medium of claim 13, wherein calculating pixel adjustment values comprises interpolating, for each degree-of-freedom within the first window, pixel adjustment values for pixels between the one or more control points; and applying, for each pixel of the plurality of pixels, a function to the interpolated pixel adjustment values for each degree-of-freedom.

15. The computer-readable storage medium of claim 14, wherein interpolating pixel adjustment values involves using one or more of:

a linear interpolation technique;

a polynomial interpolation technique; and a spline interpolation technique.

* * * * *